(12) United States Patent
Oner et al.

(10) Patent No.: US 11,235,826 B2
(45) Date of Patent: Feb. 1, 2022

(54) AUTOMATICALLY OPERATING VEHICLE BODY UNLOADING SYSTEM

(71) Applicant: Ford Global Technologies, LLC, Dearborn, MI (US)

(72) Inventors: Kadir Oner, Dearborn, MI (US); Cagatay Kocak, Dearborn, MI (US); Serdal Kavak, Dearborn, MI (US); Yavuz Sara, Dearborn, MI (US); Erkan Burgucu, Dearborn, MI (US); Alkan Özaydin, Dearborn, MI (US); Ibrahim Balkan, Dearborn, MI (US); Oemer Sahanci, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/013,045

(22) Filed: Sep. 4, 2020

(65) Prior Publication Data

US 2021/0061383 A1 Mar. 4, 2021

(30) Foreign Application Priority Data

Sep. 4, 2019 (EP) ..................................... 19195283

(51) Int. Cl.
*B62D 65/18* (2006.01)
*B65G 47/61* (2006.01)
*B65G 17/48* (2006.01)

(52) U.S. Cl.
CPC .............. *B62D 65/18* (2013.01); *B65G 47/61* (2013.01); *B65G 17/485* (2013.01); *B65G 2201/0294* (2013.01)

(58) Field of Classification Search
CPC ..................... B62D 65/18; B65G 47/61; B65G 2201/0294; B65G 47/60; B65G 17/485

(Continued)

(56) References Cited

U.S. PATENT DOCUMENTS 6,196,372 B1 * 3/2001 Rossi ..................... B62D 65/00
198/345.1
6,505,726 B1 * 1/2003 Baulier .................. B62D 65/02
198/343.2

(Continued)

FOREIGN PATENT DOCUMENTS

| EP | 0271008 | 6/1988 |
| JP | 2008184268 | 8/2008 |
| WO | 2005014377 | 2/2005 |

OTHER PUBLICATIONS

European Search Report for EP Application 19195283, dated Mar. 26, 2020.

*Primary Examiner* — James R Bidwell
(74) *Attorney, Agent, or Firm* — Burris Law, PLLC

(57) ABSTRACT

An automatically operating unloading system for unloading an at least partially assembled vehicle from an assembly-line overhead conveyor vehicle carrier is provided. The vehicle carrier includes four hanger arms for supporting the vehicle from underneath, and ends of the hanger arms are pivotally articulated about a perpendicular axis in a lockable manner. The automatically operating unloading system includes at least one rail at a side of a flat conveying system and a front hanger arm manipulator and a rear hanger arm manipulator movably arrangeable on the at least one rail. Each of the front and rear hanger arm manipulators are equipped with at least one controllable actuator. The automatically operating unloading system further includes a controllable drive unit for moving the manipulators along the rails and an electronic control unit configured to control the actuators of the front and rear hanger arm manipulators.

20 Claims, 7 Drawing Sheets

(58) Field of Classification Search
USPC .................. 198/465.4, 346.2, 346.3, 680
See application file for complete search history.

(56) References Cited

U.S. PATENT DOCUMENTS

| | | |
|---|---|---|
| 6,695,126 B2 | 2/2004 | Minamikawa |
| 6,814,219 B2 | 11/2004 | Shimizu |
| 7,461,733 B2* | 12/2008 | Dohi ..................... B62D 65/18 198/345.1 |
| 7,475,770 B1* | 1/2009 | Strange ................ B62D 65/18 198/345.1 |
| 8,230,988 B2 | 7/2012 | Tada et al. |
| 10,189,521 B2* | 1/2019 | Mayr .................... B62D 65/18 |
| 2002/0175048 A1* | 11/2002 | Shimizu ............... B62D 65/18 198/474.1 |
| 2006/0032728 A1 | 2/2006 | Smith et al. |
| 2016/0144910 A1 | 5/2016 | Waki et al. |
| 2019/0185086 A1* | 6/2019 | Jung ..................... B65G 17/32 |

\* cited by examiner

AUTOMATICALLY OPERATING VEHICLE BODY UNLOADING SYSTEM

CROSS-REFERENCE TO RELATED APPLICATIONS

This application claims priority to and the benefit of EP19195283.7 filed on Sep. 4, 2019. The disclosure of the above application is incorporated herein by reference.

FIELD

The present disclosure relates to an automatically operating unloading system for unloading an at least partially assembled vehicle from an assembly-line overhead conveyor vehicle carrier.

BACKGROUND

The statements in this section merely provide background information related to the present disclosure and may not constitute prior art.

In the field of automotive assembly, it is known to employ assembly line conveyors of different types, which may be operated at different conveyor speeds, and to transfer vehicles between different assembly-line conveyors. In particular, it is common to carry a vehicle with installed tires with an assembly line carrier to another assembly line conveyor, such as a slat assembly line conveyor, a side-mounted assembly line or an overhead assembly line conveyor, which may be a final line conveyor, supporting the vehicle from under its tires.

By way of example, U.S. Pat. No. 8,230,988 describes an apparatus for transferring vehicles onto a conveyer. The apparatus comprises a front wheel supporting device on an elevator that supports and conveys vehicles by means of wheels, moving vertically with respect to the conveyor, which is provided with a pair of front and rear wheel supporting arms that freely open and close in a horizontal direction between a closed posture supporting front wheels at a predetermined position in terms of the convey direction and an opened posture releasing the front wheels to the convey direction. The apparatus further includes a rear wheel supporting device on the elevator, which is provided with a wheel supporting plate that supports rear wheels without determining the position thereof in terms of the convey direction and that can switch its posture between a horizontal posture and a front-down tilted posture in terms of the convey direction. The apparatus comprises a posture switching device that changes the wheel supporting plate of the rear wheel supporting device to the tilted posture, at least when the elevator, supporting a vehicle with the wheel supporting arms of the front wheel supporting device in the closed posture and the wheel supporting plate of the rear wheel supporting device in the horizontal posture, is at the lowermost position for transferring the vehicle onto a conveyor.

In the art, it is further known to employ carriers such as drop lifters for the transfer of vehicles between different assembly-line conveyors, the carriers comprising hanger arms for supporting the vehicle from underneath, for instance from underneath the tires.

U.S. Patent Publication No. 2006/0032728 describes an apparatus that automatically lifts a vehicle from a continuously moving first conveyor such as an overhead or a side lift vehicle assembly line conveyor carrier so that the vehicle can be stabilized for assembly processes or can be unloaded from the assembly line conveyor. An overhead conveyor system may carry partially completed vehicles by carriers. The carriers may be controlled by the overhead conveyor system and can engage and disengage from the vehicle through control signals. The apparatus generally consists of a lift shuttle conveyed along guide rails positioned below the vehicle assembly conveyor system and with a lifting mechanism extending upwardly from the lift shuttle. The lifting mechanism rises to engage, stabilize and lift the vehicle from the overhead carrier. Various elevations can be obtained with the lifts to accommodate various processes and product requirements. After traveling along the lift shuttle conveyor, the vertical lifts lower the vehicle to either place the vehicle back on the overhead conveyor carrier or place the vehicle on a second conveyor or such as a floor conveyor where it is moved to further assembly operations or moved to a staging area. The shuttle then returns to its initial position to repeat the process for the next vehicle.

Furthermore, Japanese Patent Publication No. 2008184268 proposes an elevating/transferring device for transferring a vehicle body of an automobile from a trolley conveyer to a slat conveyor. The elevating/conveying means comprises a pair of right and left elevating bodies, a pair of right and left forward/backward moving bodies supported by the elevating bodies, a front wheel supporting means and a rear wheel supporting means disposed to each forward/backward moving body to be switched between a supporting position of an article to be conveyed and a retreated position of an article to be conveyed. The elevating/conveying means further includes a driving means for return which moves back the forward/backward moving bodies in a direction reverse to a conveying direction of the slat conveyor to a home position, and a part to be engaged for synchronization disposed to each of the forward/backward moving bodies. A synchronizing means comprises a movable body moving in horizontal and vertical directions, a pair of right and left engaging parts for synchronization disposed to the movable body to allow the part to be engaged for synchronization being vertically engaged/disengaged, and a movable body driving means synchronously moving the movable body in the conveying direction of the slat conveyor by a predetermined distance, and then moving back the movable body to the home position.

From U.S. Pat. No. 6,695,126, a vehicle body transfer apparatus is known that hangs and transfers a vehicle body of every vehicle type. The apparatus includes a hanger that supports the vehicle body in a hanging condition, and moves along a transfer path, and vehicle body support parts that adjust supporting positions on the vehicle body in the hanger based upon a center of gravity of the vehicle body of each vehicle type. In the hanger are pivotably provided arms at both of right and left sides of an arm support frame. The arms are closed when supporting the vehicle body, and opened to both of right and left sides when releasing the vehicle body, using an open/close mechanism of the hanger. In addition, the arms, when closed, are locked in such a state as to hold the vehicle body, and, when opened, are unlocked in such a state that the vehicle body is vertically movable with the drop lifter, using an open/close lock mechanism of the hanger.

The hanger includes center-of-gravity management plates having a plurality of vehicle body support parts that support the vehicle body according to the vehicle type of the vehicle body. The apparatus may be applied for transferring vehicle bodies to an overhead conveyor provided in an automotive assembly line for constructing four-wheel automobiles. The vehicle body transfer apparatus may comprise an overhead conveyor for hanging and transferring the vehicle body, and a drop lifter having a means for adjusting positions on the vehicle body at which the vehicle body is supported. The drop lifter is a relocation means that relocates the vehicle body conveyed through a friction conveyor onto the overhead conveyor. The overhead conveyor supports the vehicle body in such a manner that the center of gravity of the vehicle body of every vehicle type and the center of the hanger are substantially aligned (or are precisely aligned) with each other, in order to hang the vehicle body of every vehicle type in a stable condition.

Moreover, in U.S. Pat. No. 6,814,219 an overhead conveyor is described in which a pair of front hanger arms for loading the bottom of a front part of a vehicle body and a pair of rear hanger arms for loading the bottom of a rear part of a vehicle body are arranged at a hanger body which moves along with a running rail established in the ceiling. The pair of front hanger arms and the pair of rear hanger arms are movably attached to the hanger body. The hanger body has an engaging groove for engaging the movably attached pair of hanger arms at each engaging position of the vehicle body through each an engaging lever, having an actuator to control the engaging-and-disengaging movement of the engaging lever.

Various types of sensors may be arranged on the overhead conveyor, such as a sensor that detects the stop position of each hanger body, a sensor which detects the moved position of an engaging lever or the rear hanger arm on each of the engaging grooves of the hanger body, and detects whether the engaging lever can be engaged with or disengaged from each engaging groove, at the moved position. Further, the overhead conveyor may be equipped with a sensor which detects whether the engaging lever is being engaged to the engaging groove or not, a sensor which detects whether each of vehicle body supporting parts is supporting the vehicle body, and/or a sensor which detects whether each of rotation arms is opened at the delivery position of the vehicle body.

Hanger arms of a carrier may be closed when supporting a vehicle body, and may be opened when releasing the vehicle body, using an open/close mechanism of the hanger. Such mechanisms may require quite some operational space, particularly to the side, and a drive of the mechanism, a corresponding electric cable or pressure hose connection and the mechanism itself may turn out to be expensive, heavy and have to be carried as well, together with the vehicle. On the other hand, manual operation of such open/close mechanisms of a hanger is labor-intensive and may involve a certain risk of injury.

In view of the prior art, the field of transfer of vehicles between different assembly-line conveyors still offers room for improvement.

SUMMARY

This section provides a general summary of the disclosure and is not a comprehensive disclosure of its full scope or all of its features.

In one form, the present disclosure provides an automatically operating unloading system for unloading an at least partially assembled vehicle from an assembly-line conveyor vehicle carrier that reduces lateral operational space and that omits carrying a vehicle release mechanism drive. In another form, the present disclosure provides an assembly-line conveyor vehicle carrier system with an automatic unloading operation feature, in which it is omitted to carry a vehicle release mechanism drive and that reduces lateral operational space during unloading.

It should be noted that the features and measures listed individually in the following description can be combined with one another in any technically meaningful manner and show further forms of the present disclosure. The description additionally characterizes and specifies the present disclosure in particular in connection with the figures.

In one form of the present disclosure, an automatically operating unloading system for unloading an at least partially assembled vehicle from an assembly-line overhead conveyor vehicle carrier is provided. The vehicle carrier comprises four hanger arms for supporting the vehicle from underneath, and ends of the hanger arms are pivotally articulated about a perpendicular axis in a lockable manner.

For each side of the flat conveying system, the unloading system includes at least one rail, a front hanger arm manipulator and a rear hanger arm manipulator. The at least one rail is arrangeable at a side of a flat conveying system, parallel to a conveying direction. The front hanger arm manipulator and the rear hanger arm manipulator are movably arrangeable on the at least one rail.

The unloading system further comprises a controllable drive unit for moving the manipulators along the rails, and an electronic control unit. Here, each hanger arm manipulator is equipped with at least one controllable actuator, and the electronic control unit is at least configured to control the actuators and to control the drive unit.

In one form, the unloading system in accordance with the present disclosure can be employed with an assembly-line overhead conveyor vehicle carrier that has an as little as possible lateral operational space for releasing a carried at least partially assembled vehicle. In another form, the unloading system can omit a drive for an open/close mechanism of the assembly-line overhead conveyor vehicle carrier as well as a corresponding electric cable or pressure hose connection that would have to be carried with the overhead conveyor vehicle carrier. Further, the ends of the hanger arms of the assembly-line overhead conveyor vehicle carrier can be transferred in a fast and reliable manner between a closed position, in which they are arranged for supporting the vehicle from underneath, and an open position, in which there is a lateral clearance to a side of the vehicle that is closest to the respective hanger arm end.

In particular, the present disclosure is applicable with in the automotive sector. The term "automotive", as used in the present application, shall particularly be understood as being suitable for use with vehicles including passenger cars, transporters, trucks and buses.

In some forms of the unloading system, the at least one controllable actuator of each hanger arm manipulator is configured, by control, to linearly push or pull a locking mechanism of one of the hanger arm ends. In this way, the ends of the hanger arms can be unlocked from the closed position in a constructively simple and reliable manner, reducing hardware effort.

In some forms of the unloading system, the at least one controllable actuator of each hanger arm manipulator is alternatively or in addition configured, by control, to rotate one of the hanger arm ends about the perpendicular axis.

In this way, the ends of the hanger arms can be rotated from the closed position to the open position in a constructively simple and reliable manner, reducing hardware effort.

The at least one controllable actuator that is configured to rotate one of the hanger arm ends may be configured to directly rotate one of the hanger arm ends. The at least one controllable actuator may alternatively be operatively connected to a gear unit which in turn may be operate fully connected to the hanger arm such that a movement of the at least one controllable actuator is converted into a rotational movement of the hanger arm end.

In some forms, the at least one controllable actuator of each hanger arm manipulator is formed by an electric actuator, a pneumatic actuator and/or a hydraulic actuator. By that, a wide range of applications with different requirements and/or different available facilities can be covered.

In some forms of the unloading system, the electronic control unit comprises at least one programmable logic controller (PLC). The at least one PLC can allow for fast modification of controlling steps, if so desired. PLCs are also well known for being able to withstand a rough environment in terms of temperature and humidity, such as exist in a factory environment.

In some forms, each hanger arm manipulator is equipped with a proximity sensor for sensing a presence of one of the hanger arms to be expected in a predetermined distance range. In this way, each hanger arm manipulator can automatically be led by the drive unit to a position of one of the hanger arm ends provided that the assembly-line overhead conveyor vehicle carrier drops the at least partially assembled vehicle onto a predetermined position of the flat conveying system within the predetermined distance range. By that, a desired manipulation of the hanger arm ends as described above can be carried out by the hanger arm manipulators.

The proximity sensor may be formed, without being limited to, by a capacitive sensor, an inductive sensor or an RFID (radio-frequency identification) reading device with an appropriate reading range that is configured for reading an RFID tag attached to one of the hanger arms. The proximity sensors of the hanger arm manipulators may be equally designed, but they may also be based on different operating principles.

In another form of the present disclosure, an assembly-line overhead conveyor vehicle carrier system is provided. The assembly-line overhead conveyor vehicle carrier system includes a vehicle carrier having four hanger arms for supporting an at least partially assembled vehicle from underneath. Ends of each of the hanger arms are pivotally articulated about a perpendicular axis in a lockable manner. Further, the assembly-line overhead conveyor vehicle carrier system comprises an automatically operating unloading system in accordance with the present disclosure. For each side of the flat conveying system, the at least one rail is arranged at a side of a flat conveying system, and the front hanger arm manipulator and the rear hanger arm manipulator are movably arranged on the at least one rail.

The benefits described beforehand in context with the automatically operating unloading system may also apply to the proposed assembly-line overhead conveyor vehicle carrier.

In some forms of the assembly-line overhead conveyor vehicle carrier, the ends of the hanger arms are pivotally articulated about a perpendicular axis in a lockable manner such that the ends are at least locked in a closed position in which they are arranged for supporting the vehicle from underneath, and in an open position in which there is a lateral clearance to a side of the vehicle that is closest to the respective hanger arm end.

In yet another form of the present disclosure, a method of operating the proposed assembly-line overhead conveyor vehicle carrier for unloading an at least partially assembled vehicle is provided.

The method comprises at least the following steps:
put down an at least partially assembled vehicle onto a flat conveying system at a predetermined location,
transfer front hanger arm manipulators from a home position to a starting position,
triggered by its proximity sensor signal meeting a predefined condition with regard to a predefined threshold value and controlled by the electronic control unit, activate an actuator of each hanger arm manipulator for unlocking a locking mechanism of one of the hanger arm ends, and
controlled, by the electronic control unit, activate an actuator of each hanger arm manipulator for rotating one of the hanger arm ends about the perpendicular axis from a closed position in which it is arranged for supporting the vehicle from underneath to an open position in which there is a lateral clearance to a side of the vehicle that is closest to the respective hanger arm end.

The benefits described beforehand in context with the automatically operating unloading system can apply to the proposed method of operating the assembly-line overhead conveyor vehicle carrier in accordance with the present disclosure for unloading an at least partially assembled vehicle to the full extent.

In one form, the method further includes the following subsequent steps:
lift the overhead conveyor vehicle carrier,
transfer the front hanger arm manipulators to the home positions, and
return the overhead conveyor vehicle carrier to a location of another at least partially assembled vehicle.

With these steps closing a loop, the method can be carried out once again.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which:

FIG. 1 schematically shows an assembly-line overhead conveyor vehicle carrier system in accordance with the present disclosure in an elevated side view in a state after unloading a vehicle;

Figure 1:
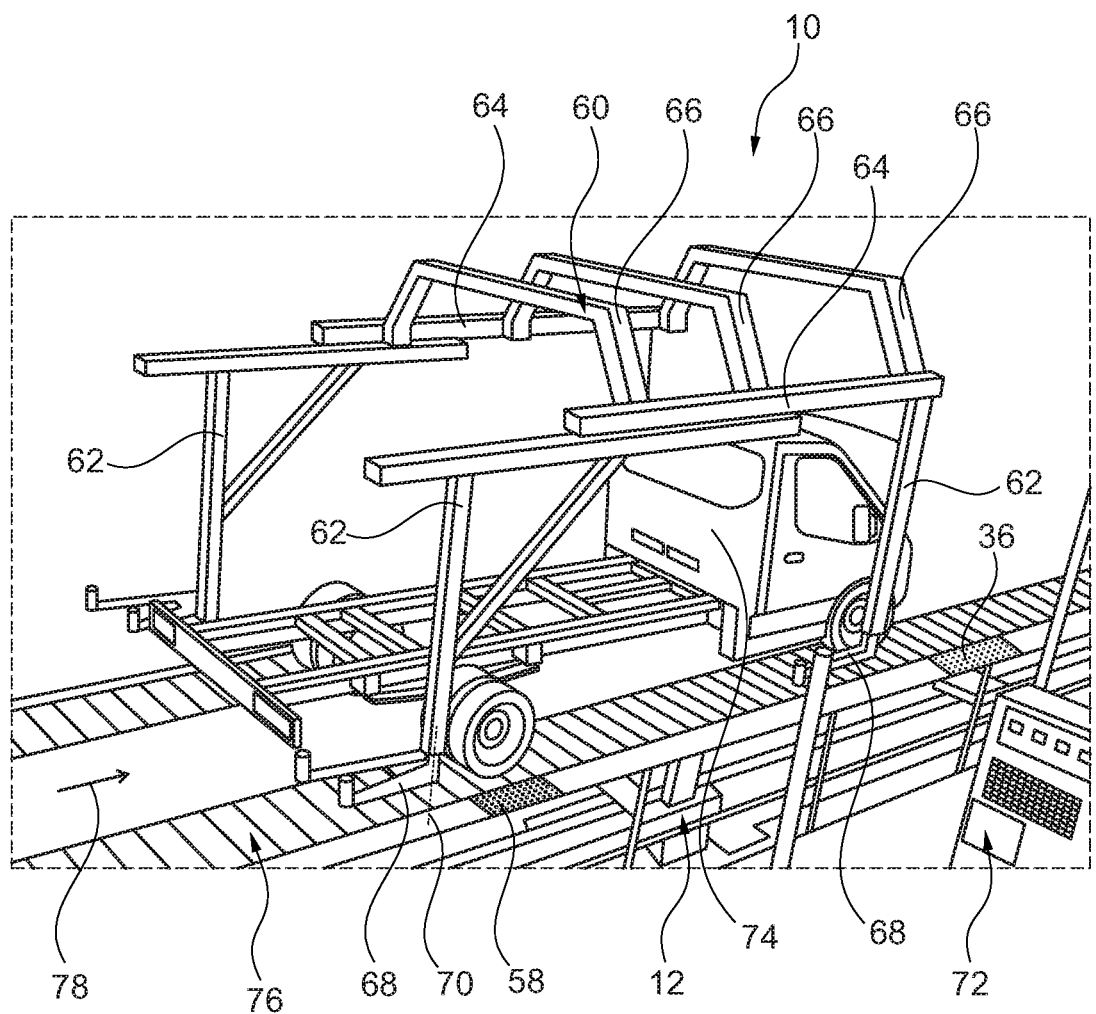

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

FIG. 1 schematically shows an assembly-line overhead conveyor vehicle carrier system 10 in accordance with the present disclosure in an elevated side view in a state after unloading a partially assembled vehicle 74.

The assembly-line overhead conveyor vehicle carrier system 10 is employed for dropping vehicles from an overhead conveyor of a chassis line onto a flat conveying system 76 of a final line, which comprises for example a slat conveyor. The vehicles come from the chassis line with tires assembled.

The assembly-line overhead conveyor vehicle carrier system 10 includes a vehicle carrier 60 having four hanger arms 62 rigidly protruding downwards from ends of two spaced longitudinal beams 64 connected by three spacedly arranged cross beams 66. The longitudinal beams 64 are aligned in a conveying direction 78 of the slat conveyor, and are designed to have telescopic ends for adapting to different vehicle lengths.

The four hanger arms 62 are designed for supporting a partially assembled vehicle 74 from underneath at its chassis. Ends 68 of each of the hanger arms 62 are pivotally articulated about a perpendicular axis 70 in a lockable manner to provide safe transportation of the vehicle 74.

The ends 68 of the hanger arms 62 are locked in a closed position in which they are arranged for supporting the vehicle 74 from underneath, and are unlocked in an open position in which there is a lateral clearance to a side of the partially assembled vehicle 74 that is closest to the respective hanger arm end 68. A locking mechanism may include a spring-loaded lock with two locking positions, one in the closed position and one in the open position. Such locking mechanisms are well known to those skilled in the art and therefore need not be discussed in further detail. In FIG. 1, the ends 68 of the hanger arms 62 are shown in the open position.

Figure 2:
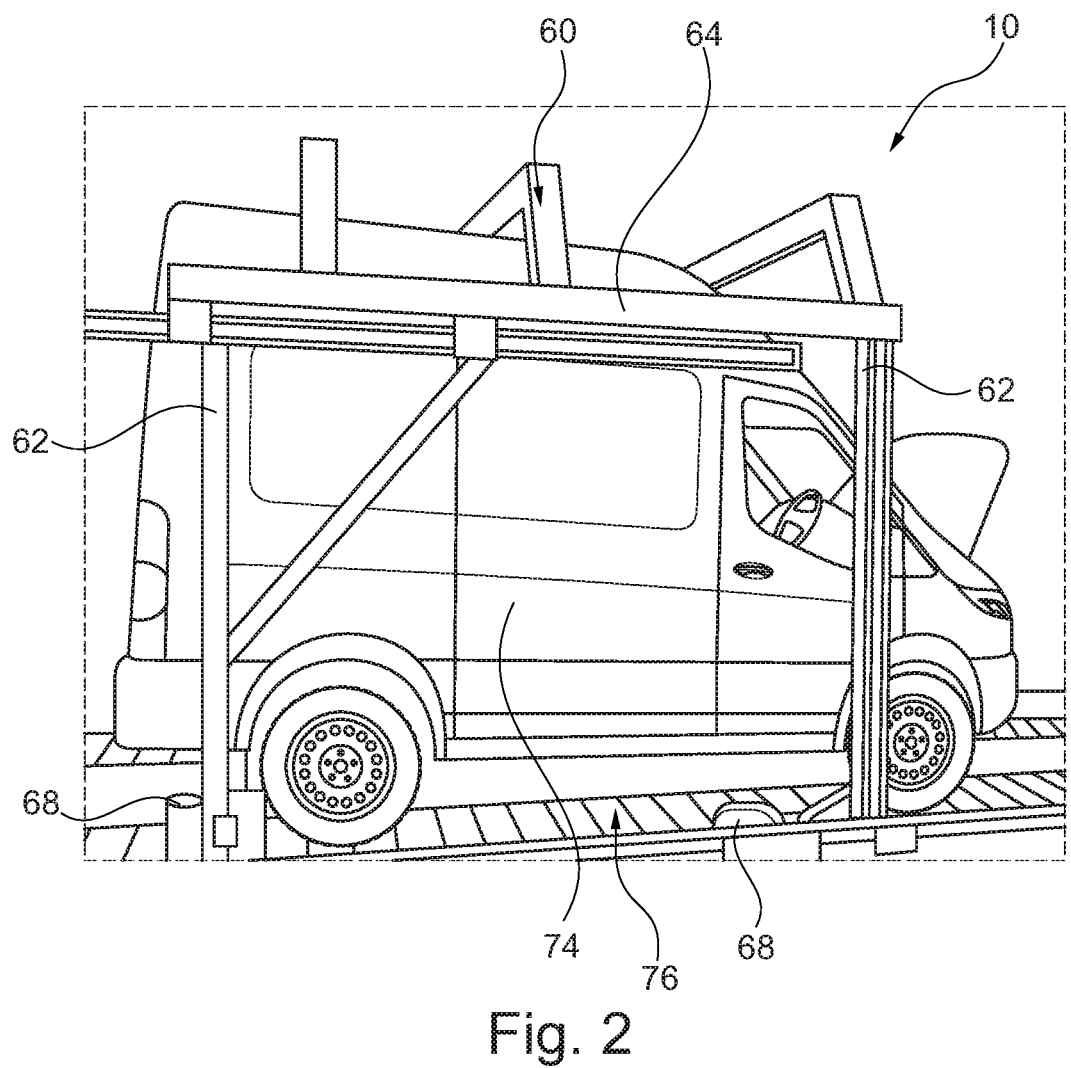
FIG. 2 is a schematic side view of the assembly-line overhead conveyor vehicle carrier system pursuant to FIG. 1 in a state of dropping a vehicle onto a flat conveying system in accordance with the present disclosure.

FIG. 2 shows a schematic side view of the assembly-line overhead conveyor vehicle carrier system 10 pursuant to FIG. 1 in a state of dropping a vehicle 74 onto the flat conveying system 76. Here, the end 68 of the front hanger arm 62 is locked in an open position, whereas the end 68 of the rear hanger arm 62 is still locked in the closed position.

The assembly-line overhead conveyor vehicle carrier system 10 further comprises an automatically operating unloading system 12 (FIG. 1). The automatically operating unloading system 12 serves for an automatic unloading of the partially assembled vehicle 74 from the vehicle carrier 60.

For each side of the flat conveying system 76, the unloading system 12 includes a rail 14 (FIG. 3) that is arranged along a side of the flat conveying system 76 and parallel to the conveying direction 78, a front hanger arm manipulator 16 and a rear hanger arm manipulator 38 that are movably arranged on the rail 14.

Figure 3:
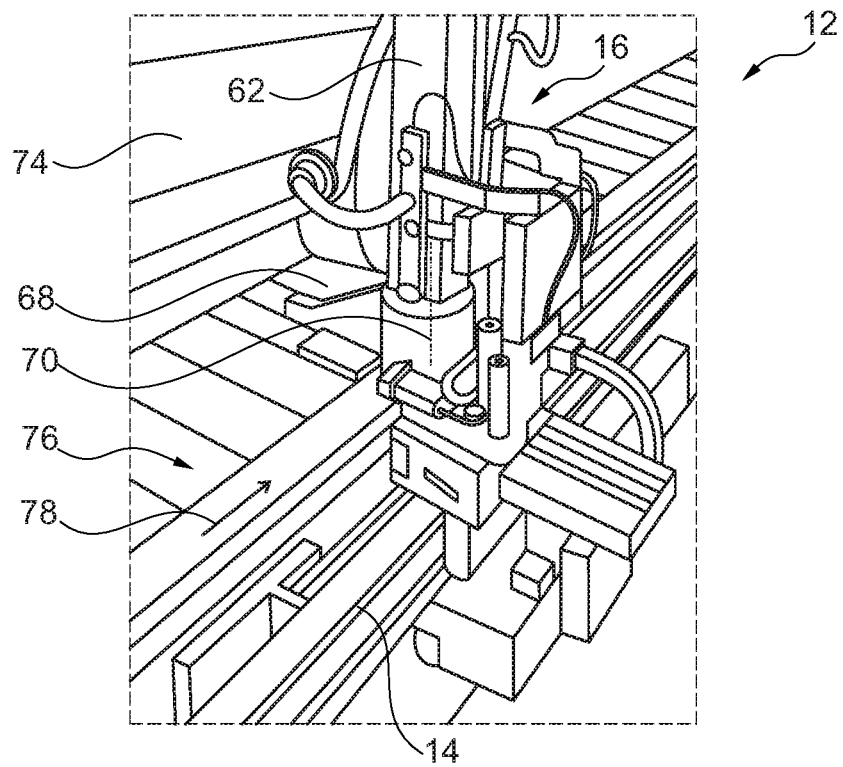
FIG. 3 is a schematic elevational view of a front hanger arm manipulator of the automatically operating unloading system pursuant to FIG. 1 at the beginning of the unloading process in accordance with the present disclosure.

FIG. 3 shows a schematic elevational view of one of the front hanger arm manipulators 16 of the automatically operating unloading system 12 pursuant to FIG. 1 at the beginning of an unloading process. A more detailed perspective view on the front hanger arm manipulator 16 is given in FIG. 5.

Figure 6:
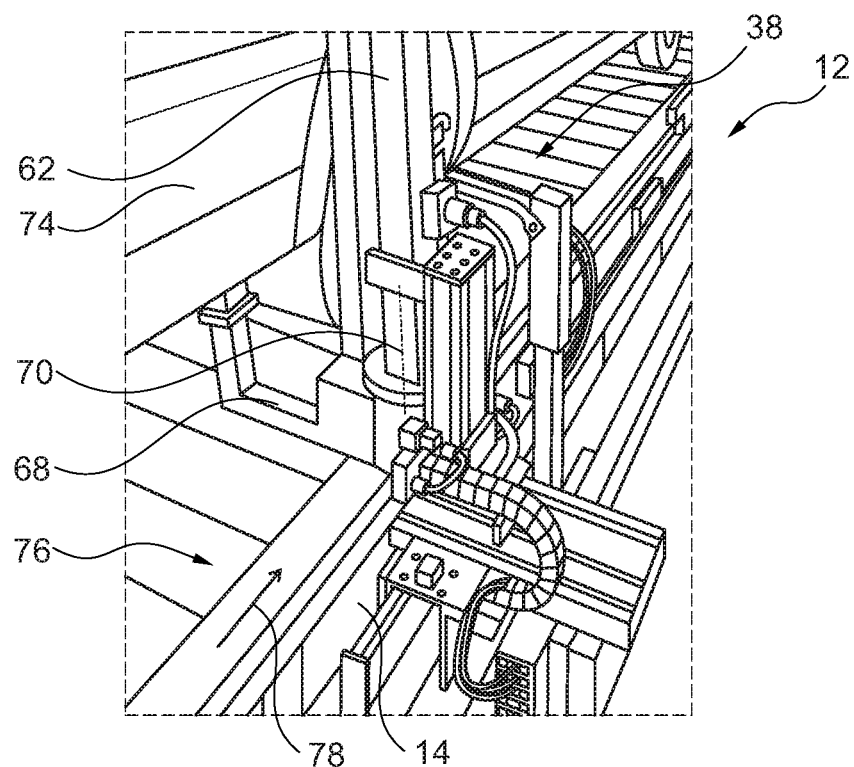
FIG. 6 is a schematic elevational view of a rear hanger arm manipulator of the automatically operating unloading system pursuant to FIG. 1 at the beginning of the unloading process in accordance with the present disclosure.

FIG. 6 shows a schematic elevational view of one of the rear hanger arm manipulators 38 of the automatically operating unloading system 12 pursuant to FIG. 1 at the beginning of the unloading process. A more detailed perspective view on the rear hanger arm manipulator 38 is given in FIG. 8.

The front hanger arm manipulators 16 at both sides of the flat conveying system 76 are mirror-inverted versions of each other, as are the rear hanger arm manipulators 38 at both the sides. Thus, it is sufficient to describe the front hanger arm manipulator 16 and the rear hanger arm manipulator 38 of one side only.

For moving the front hanger arm manipulators 16 and the rear hanger arm manipulators 38 along the rails 14, the unloading system 12 is equipped with a controllable drive unit (not shown). The controllable drive unit may include an electric motor, which may be operatively coupled to a gear unit, and a control interface.

Moreover, the unloading system 12 comprises an electronic control unit 72 (FIG. 1) that is configured for controlling the drive unit via the control interface. Appropriate interface cable or wireless connections are provided (not shown). The electronic control unit 72 may comprise a programmable logic controller (PLC), but other electronic control units are as well contemplated.

Figure 5:
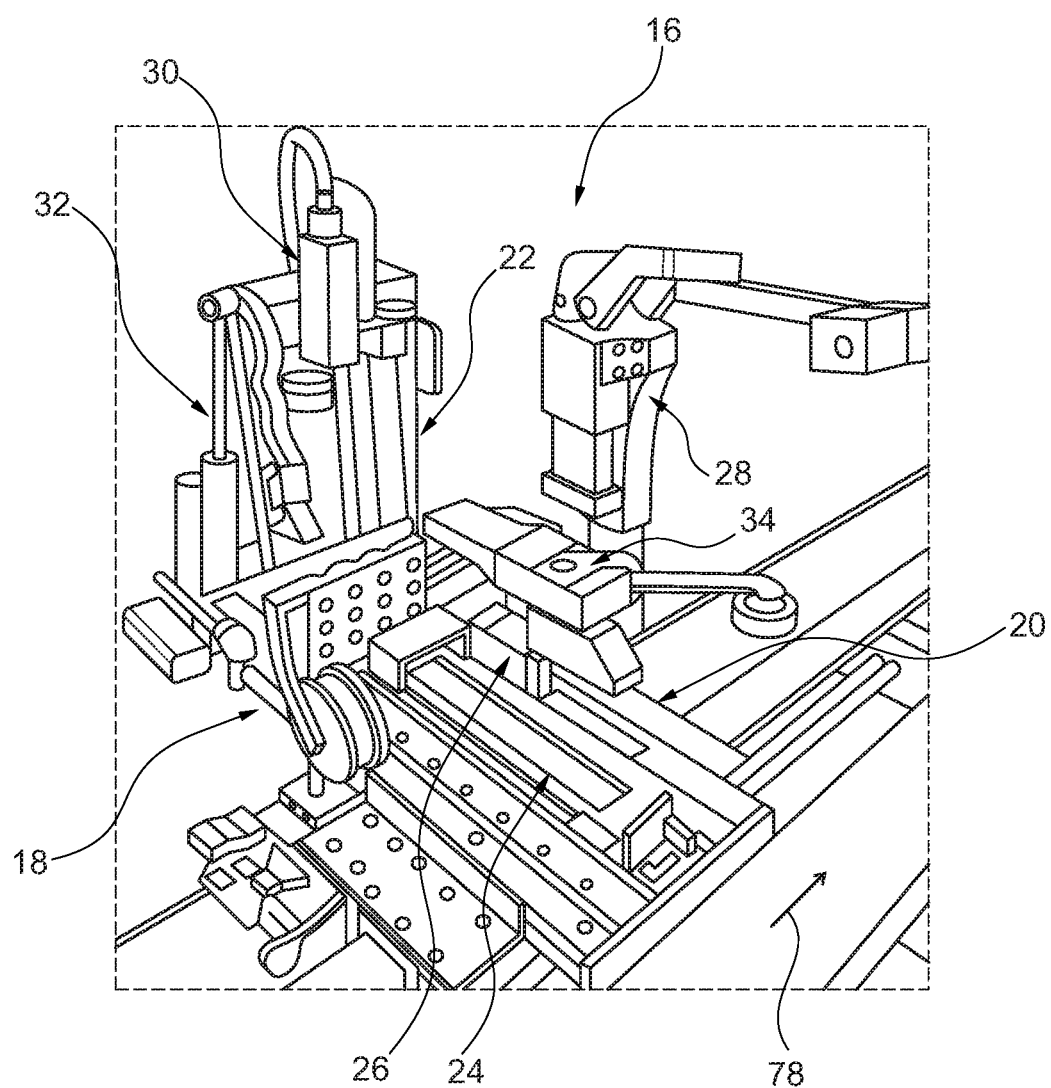
FIG. 5 is a detailed perspective view on the front hanger arm manipulator pursuant to FIGS. 3 and 4 in accordance with the present disclosure.
Figure 8:
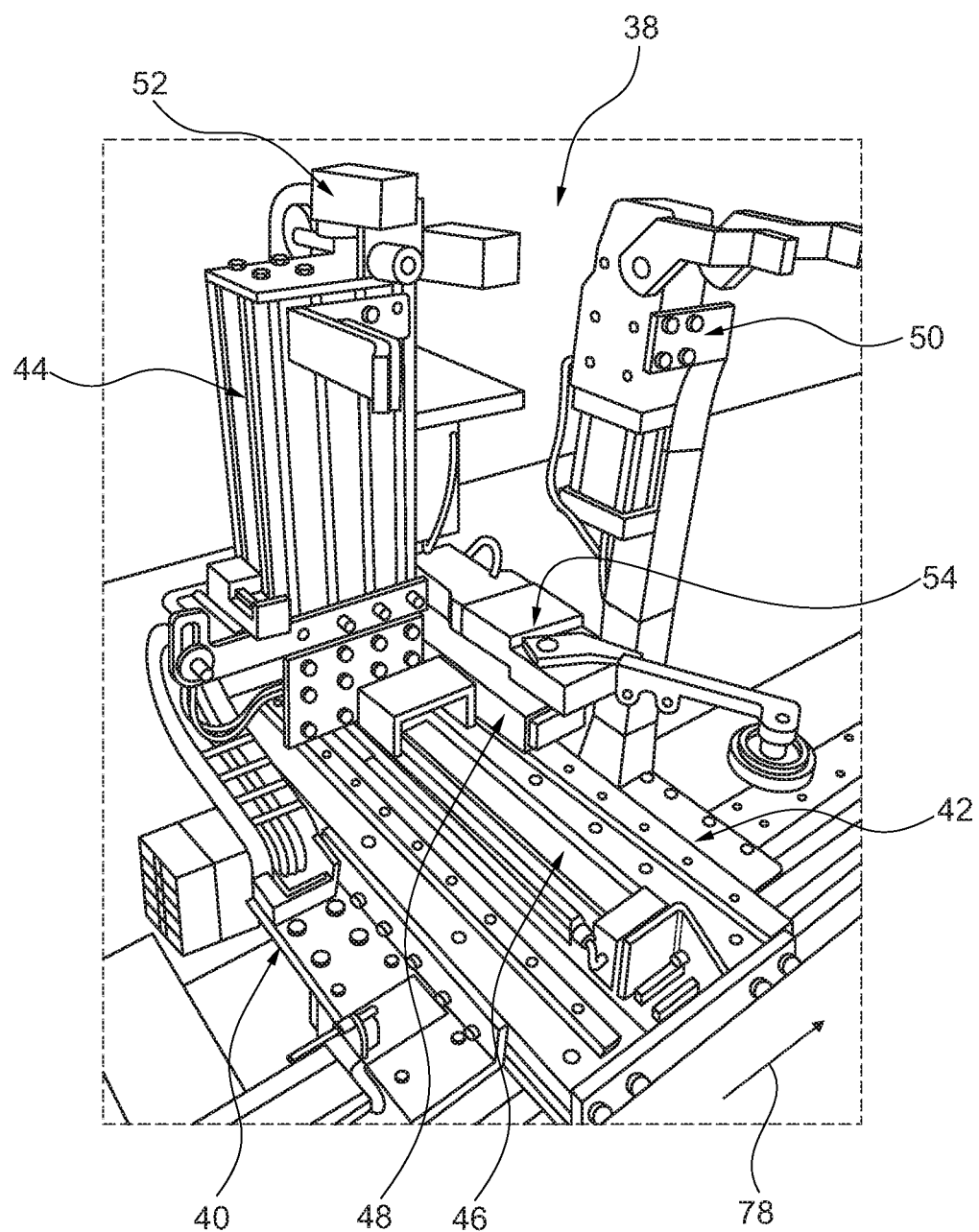
FIG. 8 is a more detailed perspective view on the rear hanger arm manipulator pursuant to FIGS. 6 and 7 in accordance with the present disclosure.

Referring now to the FIGS. 5 and 8, both the front hanger arm manipulator 16 and the rear hanger arm manipulator 38 each have a main body 18, 40 that is made from aluminum construction profiles, which allows for cost-effective and stable design of the hanger arm manipulators 16, 38.

Each hanger arm manipulator 16, 38 is equipped with a plurality of controllable pneumatic actuators, which are configured to be controlled by the electronic control unit 72. The main body 18, 40 of the hanger arm manipulators 16, 38 comprises a horizontal part 20, 42 and a vertical part 22, 44. In an operational state, the horizontal part 20, 42 is extending horizontally in a lateral direction that is aligned perpendicular to the conveying direction 78. The vertical part 22, 44 is slidably arranged on top of the horizontal part 20, 42 to be movable back and forth along the lateral direction by one pneumatic actuator 24, 46 of the plurality of controllable pneumatic actuators 24, 26, 28, 46, 48, 50 that is designed as a linear piston actuator.

Another controllable pneumatic actuator 26, 48 of each hanger arm manipulator 16, 38, a pushing actuator, is designed as a linear pneumatic piston actuator and is configured, by control, to linearly push the spring-loaded locking mechanism of one of the hanger arm ends 68 for release.

A further controllable rotation pneumatic actuator 28, 50 of each hanger arm manipulator 16, 38, a rotation actuator, is configured, by control, to rotate one of the hanger arm ends 68 about the perpendicular axis 70. The rotation actuator may be designed as a power clamp unit comprising a pneumatic cylinder that activates a rotating movement of a clamping arm via a toggle linkage. Such power clamp units are readily commercially available.

Further, each hanger arm manipulator 16, 38 is equipped with a proximity sensor 30, 52 for sensing a presence of one of the hanger arm ends 68 that are expected in a predetermined distance range in case that a partially assembled vehicle 74 is being dropped onto the flat conveying system 76. In this form, the proximity sensor 30, 52 is formed by a magnetic sensor, however, in other forms, a different type of proximity sensor that is suitable to those skilled in the art may be employed.

Each front hanger arm manipulator 16 includes two further proximity sensors, and each rear hanger arm manipulator 38 includes one further proximity sensor, which are designed as a roller-type proximity sensor 32, 34, 54, each of which comprises a roller that is attached to the vertical part 22, 44 in an articulated way and is operatively connected to a piston rod of a pneumatic cylinder. The pneumatic cylinder is equipped with a switching means that is configured to change its switching state upon sensing a predetermined piston rod position. The roller-type proximity sensors 32, 34, 54 serve for an automatic positioning of the respective hanger arm manipulator 16, 38 relative to a corresponding hanger arm 62 of the vehicle carrier 60 in the conveying direction 78 and/or in a lateral direction, respectively, i.e. in a horizontal direction that this aligned perpendicular to the conveying direction 78. To this end, data lines (not shown) between all proximity sensors 32, 34, 54 and the electronic control unit 72 are provided.

Figure 9:
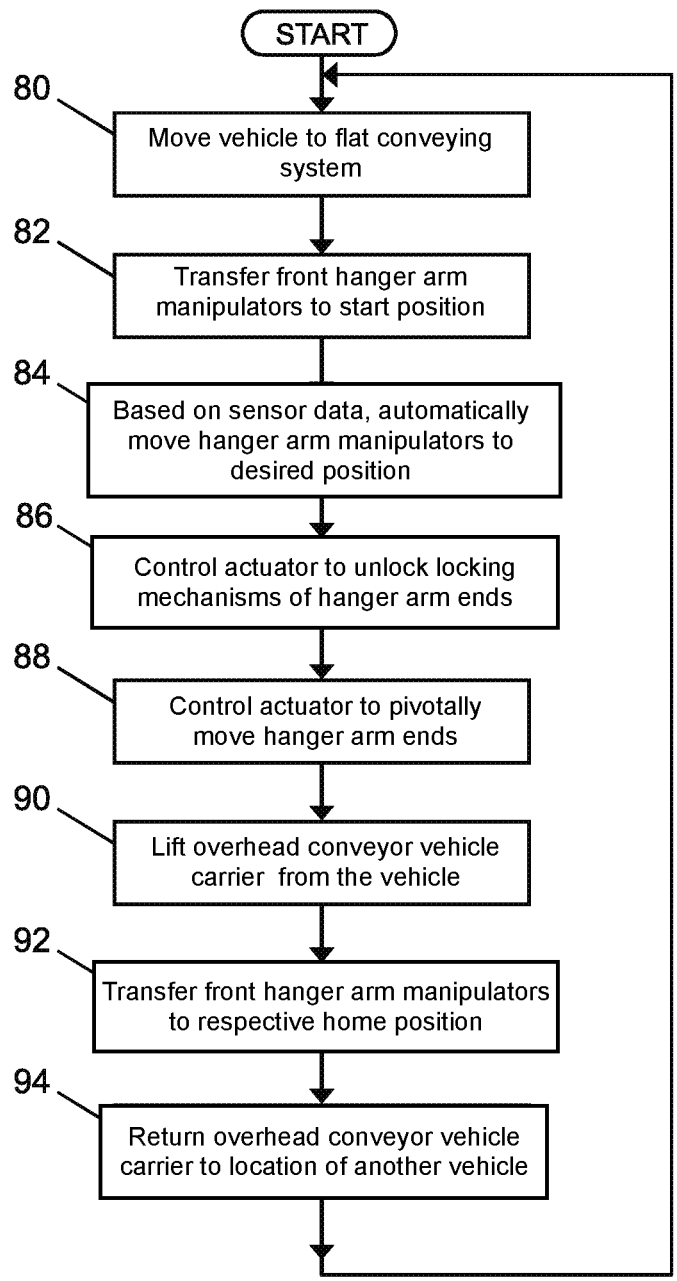
FIG. 9 is a flowchart of a method of operating the assembly-line overhead conveyor vehicle carrier system pursuant to FIG. 1 for unloading an at least partially assembled vehicle in accordance with the present disclosure.

In the following, a possible form of a method of operating the assembly-line overhead conveyor vehicle carrier system 10 pursuant to FIG. 1 for unloading a partially assembled vehicle 74 will be described with reference to FIGS. 1 to 8. A flowchart of the method is provided in FIG. 9. In preparation of operating the assembly-line overhead conveyor vehicle carrier system 10, it shall be understood that all involved units and devices are in an operational state. The front hanger arm manipulators 16 are located at home positions 36, and the rear hanger arm manipulators 38 are located at starting positions 58 at the side of the flat conveying system 76 (FIG. 1).

In one step 80 of the method, a partially assembled vehicle 74 is dropped onto the flat conveying system 76 at a predetermined location. In another step 82, the front hanger arm manipulators 16 are transferred from the home position 36 to a starting position. Using signals from the roller-type proximity sensors 32, 34, 54, each hanger arm manipulator 16, 38 is automatically positioned in a next step 84 via the drive unit and controlled by the electronic control unit 72 to a respective desired position relative to a corresponding hanger arm 62 of the vehicle carrier 60 (FIG. 3 and FIG. 6, respectively).

Triggered by a proximity sensor signal meeting a predefined condition with regard to a predefined threshold value and controlled by the electronic control unit 72, the pushing actuator 26, 48 of each hanger arm manipulator 16, 38 is activated for unlocking the spring-loaded locking mechanism of one of the hanger arm ends 68 in another step 86 of the method. By the proximity sensor signal meeting the predefined condition, the spring-loaded locking mechanism can be unlocked by the motion of the pushing actuator 26, 48.

Figure 4:
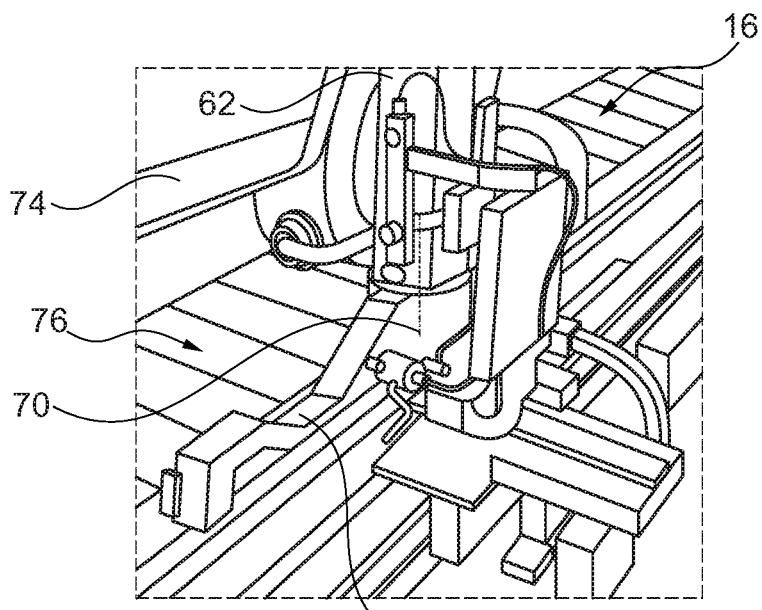
FIG. 4 is a schematic elevational view of the front hanger arm manipulator pursuant to FIG. 3 at the end of the unloading process in accordance with the present disclosure.
Figure 7:
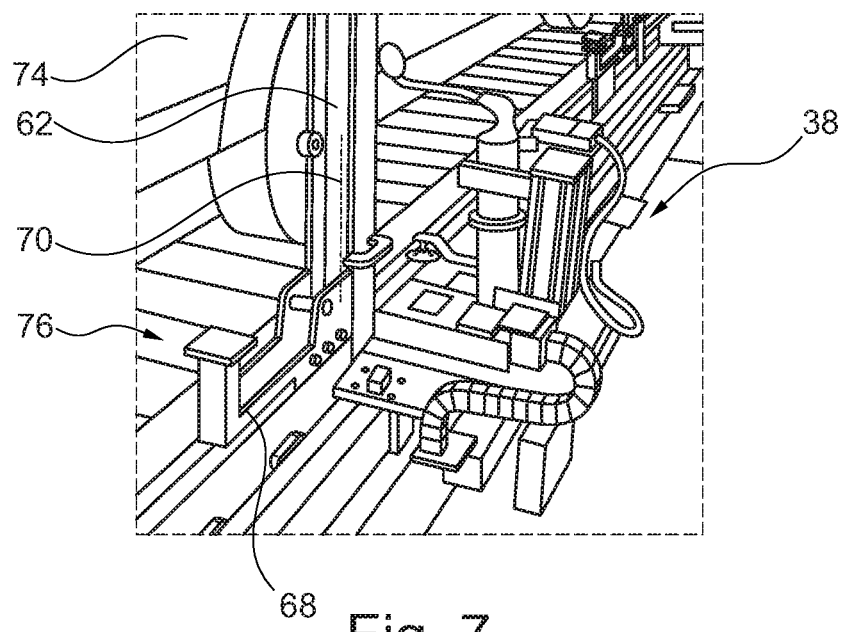
FIG. 7 is a schematic elevational view of the rear hanger arm manipulator pursuant to FIG. 6 at the end of the unloading process in accordance with the present disclosure.

In a further step 88 of the method, the rotation actuator 28, 50 of each hanger arm manipulator 16, 38 is activated, controlled by the electronic control unit 72, for rotating the corresponding hanger arm end 68 about the perpendicular axis 70 from the closed position to the open position, in which the spring-loaded locking mechanism engages again (FIG. 4 and FIG. 7, respectively).

With the end 68 of the hanger arms 62 in the open position, there is a lateral clearance between all hanger arm ends 68 and the vehicle 74 (FIG. 1). In another step 90 then, the overhead conveyor vehicle carrier 60 is lifted from the vehicle 74. The front hanger arm manipulators 16 are transferred back to their respective home position 36 in a further step 92. For completing the loop, the overhead conveyor vehicle carrier 60 is returned to the location of another partially assembled vehicle in the chassis line in a final step 94.

While the present disclosure has been illustrated and described in detail in the drawings and foregoing description, such illustration and description are to be considered illustrative or exemplary and not restrictive. The present disclosure is not limited to the disclosed forms.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. An automatically operating unloading system for unloading an at least partially assembled vehicle from an assembly-line overhead conveyor vehicle carrier, the assembly-line overhead conveyor vehicle carrier including four hanger arms for supporting the vehicle from underneath, and ends of the hanger arms being pivotally articulated about a perpendicular axis in a lockable manner, the automatically operating unloading system comprising:
   at least one rail that is arrangeable at a side of a flat conveying system, parallel to a conveying direction;
   a front hanger arm manipulator and a rear hanger arm manipulator that are movably arrangeable on the at least one rail for each side of the flat conveying system, wherein the front hanger arm manipulator and the rear hanger arm manipulator are collectively provided as hanger arm manipulators and each of the hanger arm manipulators includes at least one controllable actuator;
   a drive unit operable to move the hanger arm manipulators along the at least one rail; and
   an electronic control unit, wherein the electronic control unit is configured to control the at least one controllable actuator and to control the drive unit.

2. The automatically operating unloading system according to claim 1, wherein the at least one controllable actuator of each of the hanger arm manipulators is configured, by way of the drive unit and the electronic control unit, to linearly push or pull a locking mechanism of an end of one of the hanger arms.

3. The automatically operating unloading system according to claim 1, wherein the at least one controllable actuator of each of the hanger arm manipulators is configured, by way of the drive unit and the electronic control unit, to rotate an end of one of the hanger arms about the perpendicular axis.

4. The automatically operating unloading system according to claim 1, wherein the at least one controllable actuator of each of the hanger arm manipulators is formed by at least one of an electric actuator, a pneumatic actuator or a hydraulic actuator.

5. The automatically operating unloading system according to claim 1, wherein the electronic control unit comprises at least one programmable logic controller.

6. The automatically operating unloading system according to claim 1, wherein each of the hanger arm manipulators includes a proximity sensor for sensing a presence of one of the hanger arms to be expected in a predetermined distance range.

7. An assembly-line overhead conveyor vehicle carrier system comprising:
 a vehicle carrier having four hanger arms for supporting an at least partially assembled vehicle from underneath, wherein ends of each of the hanger arms are pivotally articulated about a perpendicular axis in a lockable manner; and
 the automatically operating unloading system according to claim 1, wherein, for each side of the flat conveying system, the at least one rail is arranged at a side of the flat conveying system, and the front hanger arm manipulator and the rear hanger arm manipulator are movably arranged on the at least one rail.

8. The assembly-line overhead conveyor vehicle carrier system according to claim 7, wherein the ends of the hanger arms are pivotally articulated about the perpendicular axis in the lockable manner such that the ends are at least locked in a closed position in which they are arranged for supporting the vehicle from underneath, and in an open position in which there is a lateral clearance to a side of the vehicle that is closest to the end of respective hanger arm.

9. A method of operating an assembly-line overhead conveyor vehicle carrier system for unloading an at least partially assembled vehicle, the assembly-line overhead conveyor vehicle carrier system including:
 a vehicle carrier having four hanger arms for supporting an at least partially assembled vehicle from underneath, wherein ends of each of the hanger arms are pivotally articulated about a perpendicular axis in a lockable manner, and
 the automatically operating unloading system according to claim 1, wherein, for each side of the flat conveying system, the at least one rail is arranged at a side of the flat conveying system, and the front hanger arm manipulator and the rear hanger arm manipulator are movably arranged on the at least one rail,
 the method comprising:
 placing the at least partially assembled vehicle down onto a flat conveying system at a predetermined location;
 transferring the front hanger arm manipulator from a home position to a starting position;
 activating, by the electronic control unit, the at least one controllable actuator of each of the hanger arm manipulators for unlocking a locking mechanism of the end of respective hanger arm in response to a proximity sensor signal meeting a predefined condition with regard to a predefined threshold value; and
 controlling, by the electronic control unit, activation of the at least one controllable actuator of each of the hanger arm manipulators to rotate the end of the respective hanger arm about the perpendicular axis from a closed position in which it is arranged for supporting the vehicle from underneath to an open position in which there is a lateral clearance to a side of the vehicle that is closest to the end of the respective hanger arm.

10. The method according to claim 9 further comprising:
 lifting the overhead conveyor vehicle carrier from the vehicle;
 transferring the front hanger arm manipulator to the home position; and
 returning the overhead conveyor vehicle carrier to a location of another at least partially assembled vehicle.

11. An automatically operating unloading system for a vehicle carrier including hanger arms, the hanger arms having ends for supporting an at least partially assembled vehicle and are pivotable between a closed position and an open position, the automatically operating unloading system comprising:
 at least one rail arranged along a side of a conveying system and parallel to a conveying direction;
 at least two hanger arm manipulators secured to and movable along the at least one rail and configured to secure the ends of the hanger arms, wherein each of the at least two hanger arm manipulators includes an actuator to automatically move the ends of the hanger arms; and
 an electronic control unit configured to control the actuators of the at least two hanger arm manipulators to move the ends of the hanger arms.

12. The automatically operating unloading system according to claim 11, wherein the actuator of each of the hanger arm manipulators is configured to engage and disengage a locking mechanism of a respective hanger arm.

13. The automatically operating unloading system according to claim 12, wherein the actuator is configured to linearly push or pull the locking mechanism.

14. The automatically operating unloading system according to claim 11, wherein the actuator is configured to rotate the end of a respective hanger arm about an axis perpendicular to the conveying direction.

15. The automatically operating unloading system according to claim 11, wherein the actuators of the hanger arm manipulators are an electric actuator, a pneumatic actuator, a hydraulic actuator, or a combination thereof.

16. The automatically operating unloading system according to claim 11, wherein each of the at least two hanger arm manipulators includes a proximity sensor configured to sense a presence of the hanger arms within a predetermined distance range.

17. The automatically operating unloading system according to claim 11, wherein each of the at least two hanger arm manipulators includes a plurality of the actuators, wherein for each of the at least two hanger arm manipulators, the plurality of the actuators includes:
 a linear actuator configured to automatically engage and disengage a locking mechanism of respective hanger arm to lock and unlock the hanger arm, respectively; and
 a rotation actuator configured to automatically pivotably rotate an end of the respective hanger arm.

18. The automatically operating unloading system according to claim 11, wherein each of the at least two hanger arm manipulators includes a plurality of proximity sensors, wherein the plurality of proximity sensors includes:
 a first proximity sensor configured to detect a presence of the respective hanger arm within a predetermined distance range, and a second proximity sensor configured to detect a relative position between of respective hanger arm manipulator with the respective hanger arm.

19. The automatically operating unloading system according to claim 18, wherein the electronic control unit is communicably coupled to the plurality of proximity sensors and is configured to, based on data from the plurality of proximity sensors, control position of the at least two hanger arm manipulators relative to the hanger arms and to determine whether locking mechanisms of the hanger arms is locked or unlocked.

20. An assembly-line overhead conveyor vehicle carrier system comprising:
   a vehicle carrier having four hanger arms for supporting an at least partially assembled vehicle from underneath, wherein ends of the hanger arms are pivotally rotatable and lockable via a locking mechanism; and
   the automatically operating unloading system according to claim 1, wherein the automatically operating unloading system includes four of the hanger arm manipulators such that each of the four hanger arms is provided with one hanger arm manipulator, wherein the four hanger arm manipulators are operable to automatically move and lock the ends of the four hanger arms.

* * * * *